(12) United States Patent
Hsu et al.

(10) Patent No.: US 8,834,007 B2
(45) Date of Patent: Sep. 16, 2014

(54) DISPLAY MODULE

(75) Inventors: Jia-Lang Hsu, Hsin-Chu (TW); Szu-Yuan Wang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 148 days.

(21) Appl. No.: 13/412,642

(22) Filed: Mar. 6, 2012

(65) Prior Publication Data

US 2013/0077347 A1 Mar. 28, 2013

(30) Foreign Application Priority Data

Sep. 28, 2011 (TW) .............................. 100135022 A

(51) Int. Cl.
*F21V 7/04* (2006.01)
*G02F 1/13* (2006.01)

(52) U.S. Cl.
CPC ........................................ *G02F 1/13* (2013.01)
USPC ............................ 362/634; 362/632; 362/633

(58) Field of Classification Search
CPC ..................................................... G02B 6/0038
USPC ........................................ 362/97.1, 633, 634
See application file for complete search history.

(56) References Cited

U.S. PATENT DOCUMENTS

| | | | |
|---|---|---|---|
| 2003/0164913 A1* | 9/2003 | Ogawa | 349/113 |
| 2007/0115403 A1* | 5/2007 | Chen | 349/65 |
| 2011/0234940 A1* | 9/2011 | Ishinagawa | 349/62 |
| 2011/0299006 A1* | 12/2011 | Cheng et al. | 349/58 |

FOREIGN PATENT DOCUMENTS

| | | |
|---|---|---|
| CN | 201391804 Y | 1/2010 |
| TW | 200951570 | 12/2009 |
| TW | I319107 | 1/2010 |

* cited by examiner

*Primary Examiner* — Anh Mai
*Assistant Examiner* — Zachary J Snyder
(74) *Attorney, Agent, or Firm* — Winston Hsu; Scott Margo

(57) ABSTRACT

A display module includes an outer frame, a light emitting unit, a panel device, and a light guide plate having a light entrance surface and a connecting side. A first recessed portion is formed on the connecting side. The outer frame is disposed on the light guide plate and has a second recessed portion formed thereon corresponding to the first recessed portion. The second recessed portion is complementarily connected to the first recessed portion. The light emitting unit is disposed in the outer frame corresponding to the light entrance surface for emitting light into the light guide plate via the light entrance surface. The panel device is disposed on the light guide plate and contained in the outer frame for receiving the light emitted from the light guide plate. The ratio of the length of the first recessed portion to the length of the connecting side is greater than 0.2.

4 Claims, 7 Drawing Sheets

DISPLAY MODULE

BACKGROUND OF THE INVENTION

1. Field of the Invention

The present invention relates to a display module, and more specifically, to a display module utilizing a light guide plate to be complementarily connected to an outer frame.

2. Description of the Prior Art

As a conventional display module becomes lighter, thinner, shorter, and smaller in recent years, the display module usually utilizes a design that an outer frame is directly combined with panel components (e.g. a glass protection cover and a liquid crystal panel) and backlight components (e.g. a diffuser film and a light emitting unit) to replace the prior art design that the panel components and the backlight components need to be fixed to each other by an additional iron frame first and then be assembled with the outer frame, so as to reduce space occupied by the panel components and the backlight components in the display module. This design usually utilizes an upper ear portion connected to a light exit surface of the light guide plate and protruding outwardly from a side of the light guide plate, to be stacked on the outer frame after the panel components and the backlight components are assembled with the outer frame sequentially. Accordingly, the assembly process of the display module is completed.

However, this design may cause a hot-spot or hot-line problem due to light emitting out of the upper ear portion of the light guide plate, so as to influence display quality of the display module. Furthermore, since the outer frame needs to be driven open or the light guide plate needs to be bent first so that the upper ear portion can enter the outer frame and then be stacked on the outer frame, this design may make the assembly process of the display module time-consuming and strenuous. In addition, this design may also cause the backlight components and the panel components disposed above the light guide plate to move upwardly relative to the light guide plate when the upper ear portion is stacked on the outer frame, so as to increase the overall thickness of the display module.

SUMMARY OF THE INVENTION

The present invention provides a display module including a light guide plate, an outer frame, at least one light emitting unit, and a panel device. The light guide plate has a light entrance surface and at least one connecting side. At least one first recessed portion is formed on the connecting side. The outer frame is disposed on the light guide plate and has a second recessed portion formed thereon corresponding to the first recessed portion. The second recessed portion is complementarily connected to the first recessed portion for fixing the light guide plate onto the outer frame. The light emitting unit is disposed in the outer frame corresponding to the light entrance surface for emitting light into the light guide plate via the light entrance surface. The panel device is disposed on the light guide plate and contained in the outer frame for receiving the light emitted from the light guide plate. The ratio of the length of the first recessed portion to the length of the connecting side is greater than 0.2.

The present invention further provides a display module including an outer frame, a light guide plate, at least one light emitting unit, and a panel device. The light guide plate has a light entrance surface, a light exit surface, and at least one connecting side. At least one connecting ear portion is extendedly formed from the connecting side for extending into the outer frame to fix the light guide plate onto the outer frame. The light emitting unit is disposed in the outer frame corresponding to the light entrance surface for emitting light into the light guide plate via the light entrance surface. The panel device is disposed on the light guide plate and contained in the outer frame for receiving the light emitted from the light guide plate. The connecting ear portion is away from the light exit surface by a vertical distance. The ratio of the length of the first recessed portion to the length of the connecting side is greater than 0.2.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
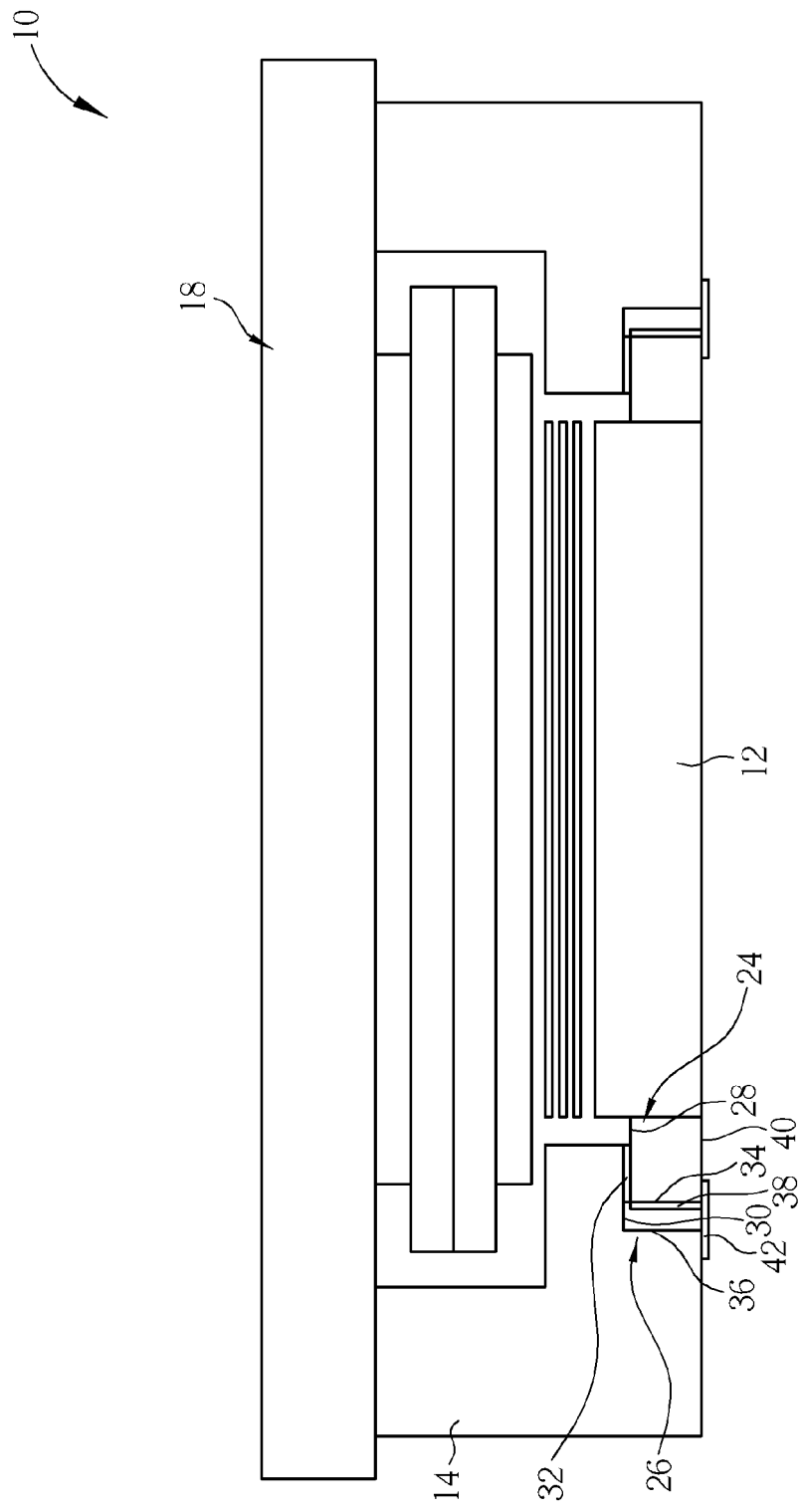
FIG. 1 is an inner front view of a display module according to an embodiment of the present invention.
Figure 2:
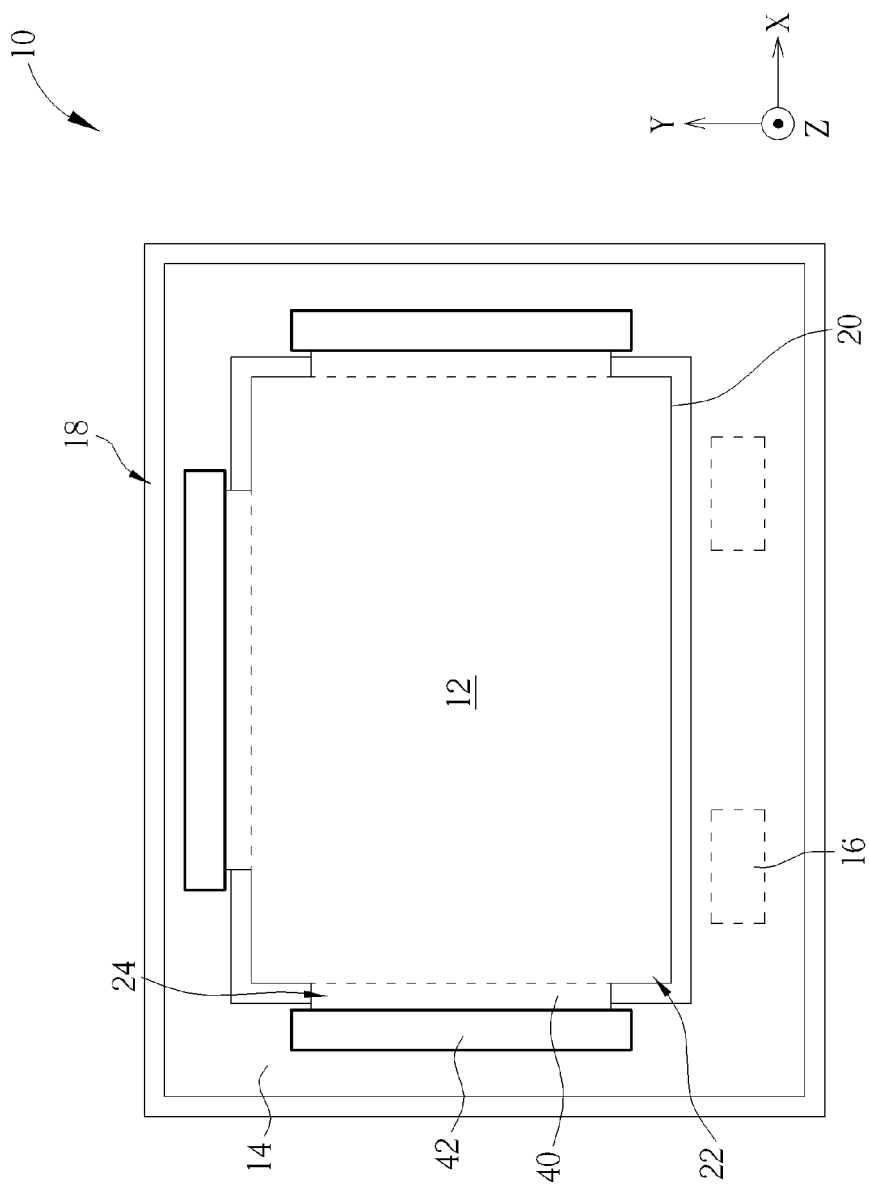
FIG. 2 is a bottom view of the display module in FIG. 1.

Please refer to FIG. 1 and FIG. 2. FIG. 1 is an inner front view of a display module 10 according to an embodiment of the present invention. FIG. 2 is a bottom view of the display module 10 in FIG. 1. As shown in FIG. 1 and FIG. 2, the display module 10 includes a light guide plate 12, an outer frame 14, at least one light emitting unit 16 (two shown in FIG. 2, but not limited thereto), and a panel device 18. The light guide plate 12 has a light entrance surface 20 and at least one connecting side 22 (three shown in FIG. 2). At least one first recessed portion 24 (one shown on each connecting side 22 in FIG. 2) is formed on the connecting side 22. The outer frame 14 is disposed on the light guide plate 12 and has a second recessed portion 26 formed thereon opposite to the first recessed portion 24. The second recessed portion 26 is complementarily connected to the first recessed portion 24 for fixing the light guide plate 12 onto the outer frame 14. The first recessed portion 24 and the second recessed portion 26 can be formed by a conventional structuring process (e.g. a cutting process). Furthermore, in this embodiment, the ratio of the length of the first recessed portion 24 along a long axis direction (i.e. Y-axis as shown in FIG. 2) of the first recessed portion 24 to the length of the connecting side 22 along the long axis direction of the first recessed portion 24 is preferably greater than 0.2. Accordingly, connection of the first recessed portion 24 and the second recessed portion 26 can provide sufficient connection force to fix the light guide plate 12 onto the outer frame 14 firmly.

The light emitting unit 16 is disposed in the outer frame 14 corresponding to the light entrance surface 20 for emitting light into the light guide plate 12 via the light entrance surface 20, so that the light guide plate 12 can provide sufficient light with uniform brightness to the panel device 18. The light emitting unit 16 can be a light source commonly applied to a display apparatus, such as an LED (Light Emitting Diode). The panel device 18 is disposed on the light guide plate 12 and contained in the outer frame 14 for receiving the light emitted from the light guide plate 12. The panel device 18 can include conventional panel components, such as a liquid crystal panel and a glass protection cover.

To be noted, number of the first recessed portion 24 on the connecting side 22 is not limited to one. In other words, the display module 10 can also have plural first recessed portions 24 formed on the connecting side 22.

More detailed description for the complementary connection design of the first recessed portion 24 and the second recessed portion 26 located at the left side of the display module 10 in FIG. 1 is provided as follows. As for description for the complementary connection designs of other first recessed portions 24 and the corresponding second recessed portions 26, it can be reasoned by analogy and therefore omitted herein. As shown in FIG. 1, the first recessed portion 24 has an upper surface 28. The second recessed portion 26 has a lower surface 30 opposite to the upper surface 28. The display module 10 further includes a first adhesive tape 32 attached between the upper surface 28 and the lower surface 30 for fixing the light guide plate 12 onto the outer frame 14 firmly. To be noted, connection of the first connecting portion 24 and the second connecting portion 26 is not limited to the aforesaid tape connection design, meaning that the display module 10 can also utilize other conventional connection design, such as utilizing screws to fix the first recessed portion 24 onto the second recessed portion 26.

In the aforesaid configuration, since the first recessed portion 24 of the light guide plate 12 can be directly connected to and located under the second recessed portion 26 of the outer frame 14, the present invention can not only simplify the assembly process of the display module 10, but also efficiently prevent light in the light guide plate 12 from emitting out of the first recessed portion 24 of the light guide plate 12, so as to solve the aforesaid hot-spot or hot-line problem. Furthermore, via the complementary connection design of the second recessed portion 26 of the outer frame 14 and the first recessed portion 24 of the light guide plate 12, the present invention can further reduce the overall thickness of the display module 10.

In this embodiment, for preventing light from emitting out of the side surface of the light guide plate 12, the first recessed portion 24 further has a first side surface 34, the second recessed portion 26 further has a second side surface 36 opposite to the firs side surface 34, and the display module 10 further includes a light shielding tape 38. The light shielding tape 38 extends from an end of the first adhesive tape 32 and is attached onto the first side surface 34 (but not limited thereto). That is, the light shielding tape 38 can also be attached onto the first side surface 34 and the second side surface 36, or only attached onto the second side surface 36. Accordingly, the display module 10 can further prevent light from emitting out of the first side surface 34 of the first recessed portion 24 by the light shielding tape 38. Furthermore, as shown in FIG. 2, the first recessed portion 24 further has a bottom surface 40 and the display module 10 further includes a second adhesive tape 42 attached between the bottom surface 40 and the outer frame 14 for enhancing the connection strength between the light guide plate 12 and the outer frame 14.

In such a manner, via attachment of the first adhesive tape 32 and the second adhesive tape 42, the light guide plate 12 can still be fixed steadily even if the display module 10 falls down on the ground or receives sudden impact, so as to efficiently prevent damage of film components (e.g. a diffuser film) located above the light guide plate 12 caused by mutual friction between the light guide plate 12 and the film components.

Figure 3:
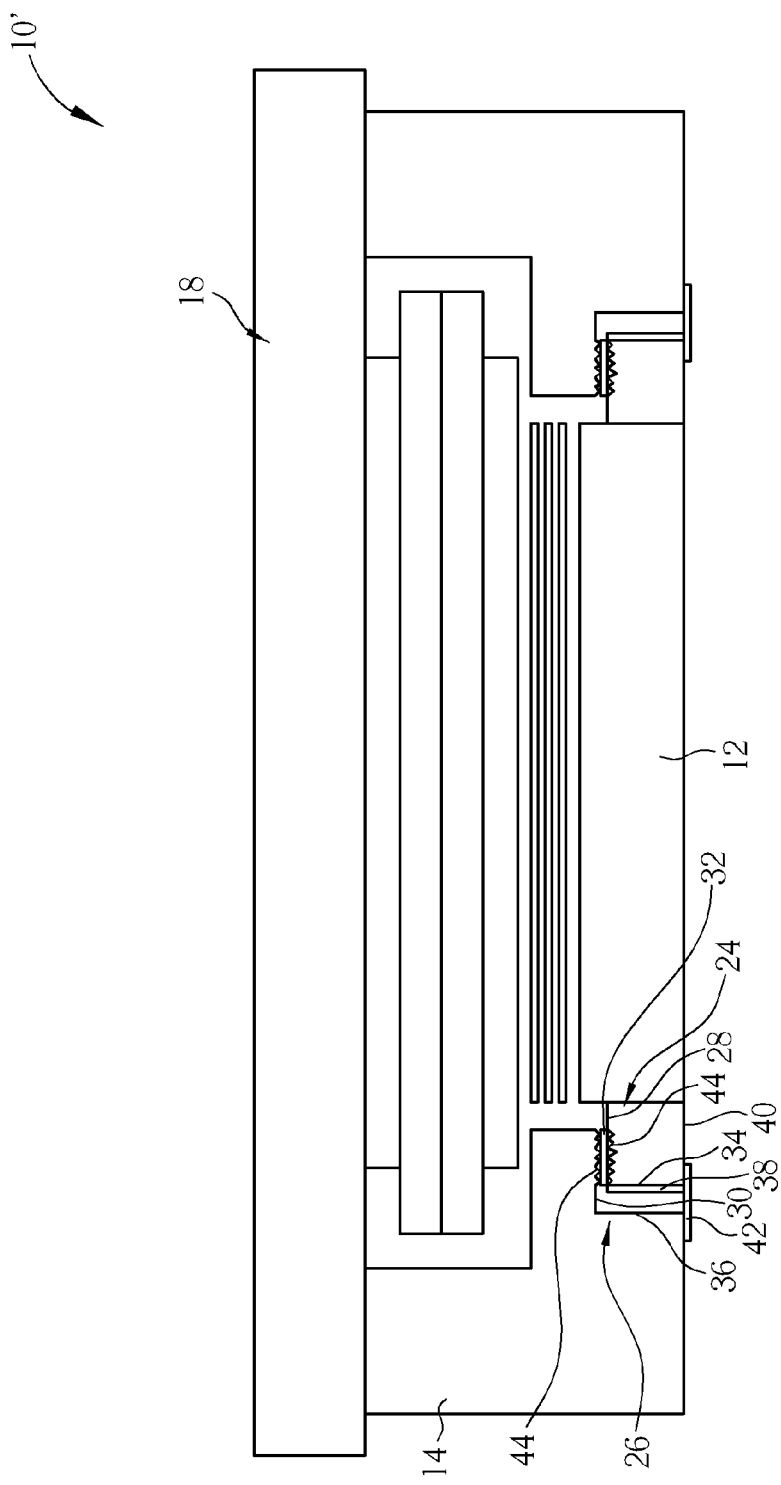
FIG. 3 is an inner front view of a display module according to another embodiment of the present invention.

Furthermore, the structural designs of the upper surface 28 of the first recessed portion 24 and the lower surface 30 of the second recessed portion 26 are not limited to the aforesaid embodiment. For example, please refer to FIG. 3, which is an inner front view of a display module 10' according to another embodiment of the present invention. Components both mentioned in this embodiment and the aforesaid embodiment represent components with similar functions or structures, and the related description is omitted herein. As shown in FIG. 3, a rough microstructure 44 is formed on the upper surface 28 of the first recessed portion 24 and the lower surface 30 of the second recessed portion 26 respectively. Accordingly, the display module 10' can utilize the rough microstructure 44 to increase the adhesive area of the first adhesive tape 32 on the upper surface 28 and the lower surface 30 when the first adhesive tape 32 is utilized to attach the upper surface 28 of the first recessed portion 24 onto the lower surface 30 of the second recessed portion 26, so as to enhance the connection strength between the first recessed portion 24 and the second recessed portion 26.

Figure 4:
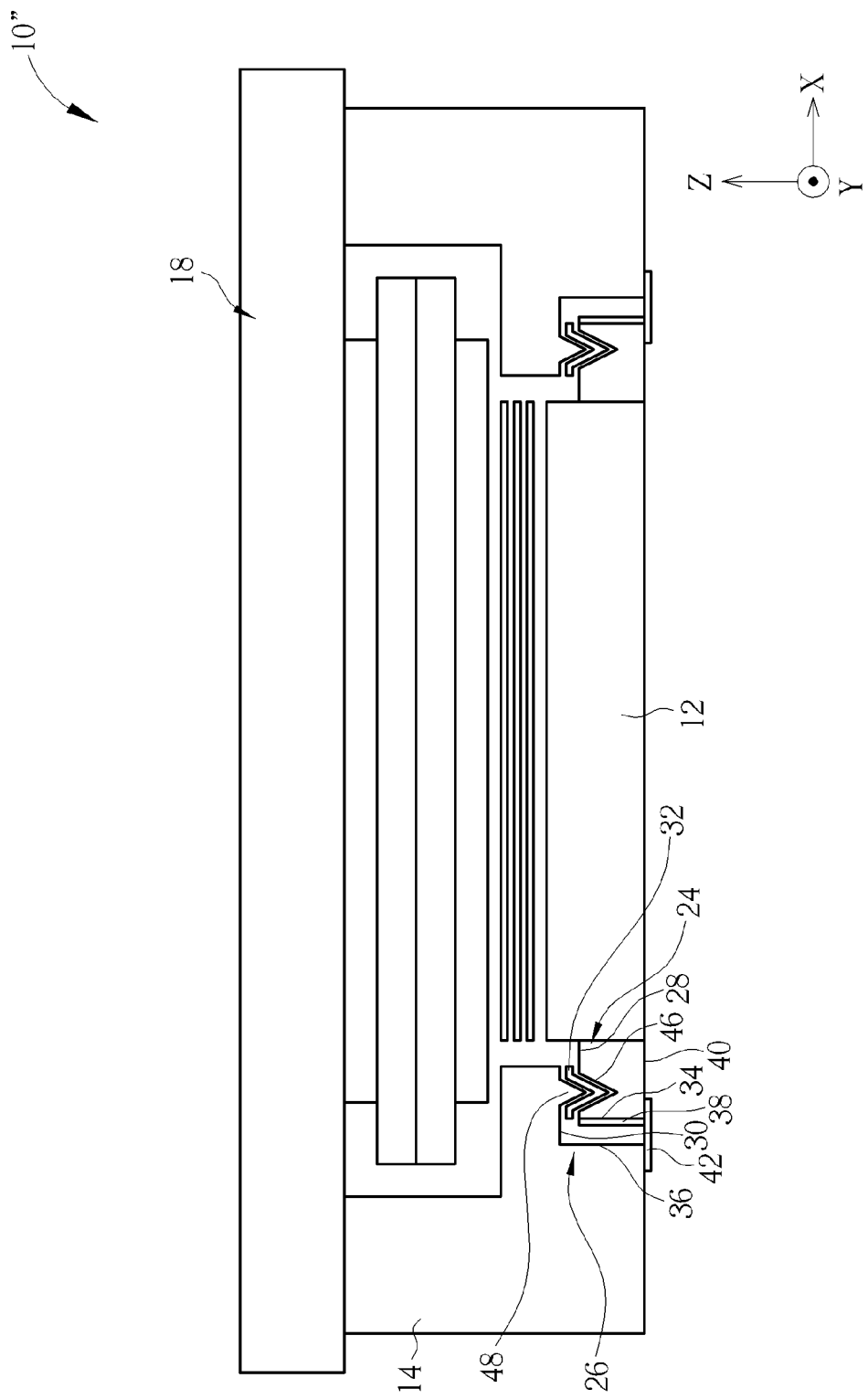
FIG. 4 is an inner front view of a display module according to another embodiment of the present invention.

Furthermore, please refer to FIG. 4, which is an inner front view of a display module 10" according to another embodiment of the present invention. Components both mentioned in this embodiment and the aforesaid embodiment represent components with similar functions or structures, and the related description is omitted herein. As shown in FIG. 4, at least one slot structure 46 (one shown in FIG. 4, but not limited thereto) is formed on the upper surface 28, and the lower surface 30 has a protruding structure 48 formed thereon corresponding to the slot structure 46. The first adhesive tape 32 is attached between the slot structure 46 and the protruding structure 48. The slot structure 46 is preferably a concave V-shaped structure, and the protruding structure 48 is a corresponding convex V-shaped structure. In such a manner, when the first adhesive tape 32 is utilize to attach the upper surface 28 of the first recessed portion 24 onto the lower surface 30 of the second recessed portion 26, the display module 10" can utilize the complementary connection of the slot structure 46 and the protruding structure 48 to increase the adhesive area of the first adhesive tape 32 on the upper surface 28 and the lower surface 30, so as to enhance the connection strength between the first recessed portion 24 and the second recessed portion 26.

Figure 5:
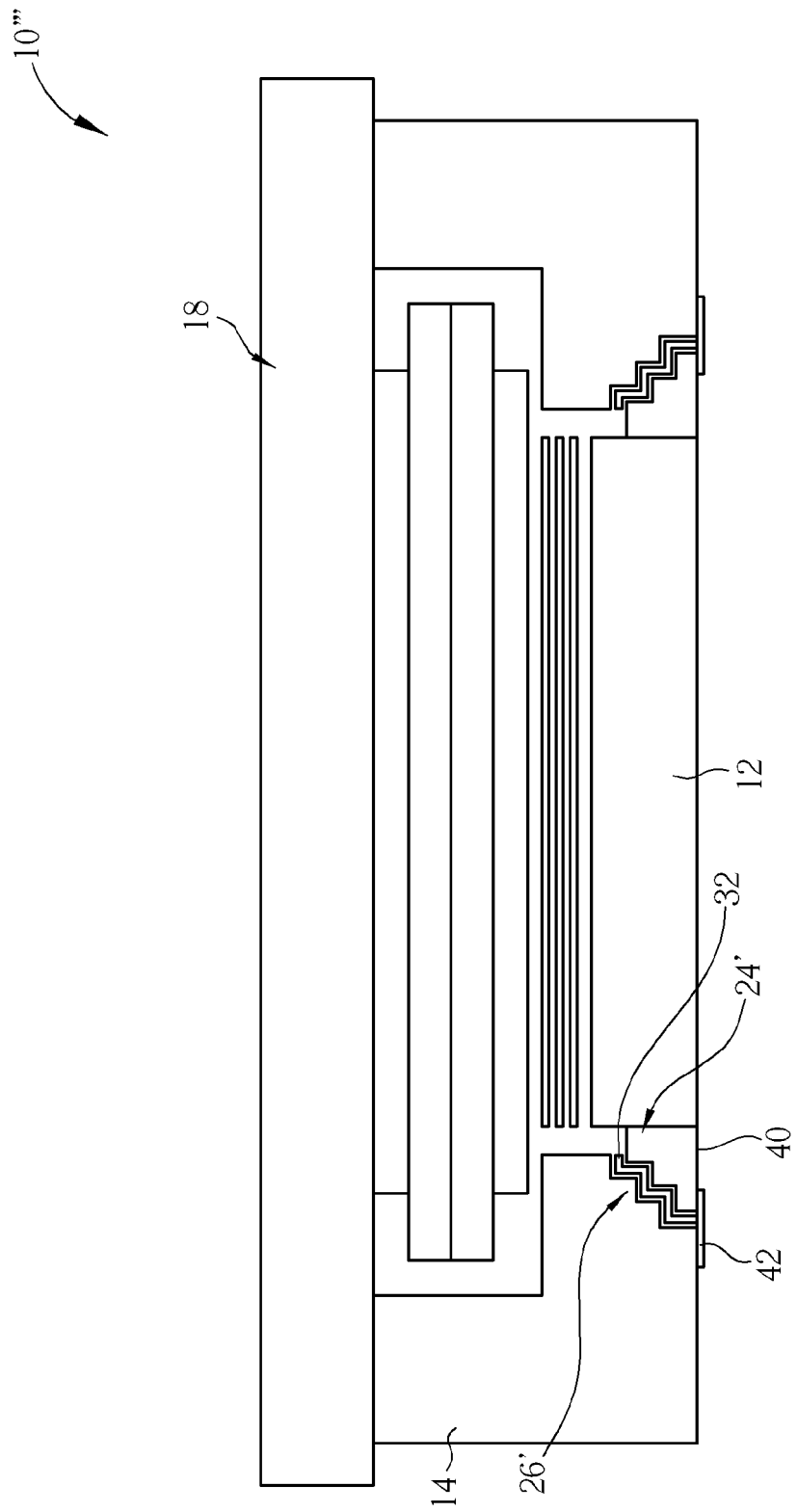
FIG. 5 is an inner front view of a display module according to another embodiment of the present invention.

The structural designs of the first recessed portion 24 and the second recessed portion 26 are not limited to the structural designs as shown in FIG. 1. For example, please refer to FIG. 5, which is an inner front view of a display module 10''' according to another embodiment of the present invention. Components both mentioned in this embodiment and the aforesaid embodiment represent components with similar functions or structures, and the related description is omitted herein. As shown in FIG. 5, a first recessed portion 24' is formed on the light guide plate 12, and the outer frame 14 has a second recessed portion 26' opposite to the first recessed portion 24'. The first recessed portion 24' and the second recessed portion 26' are complementary step structures, and the first adhesive tape 32 is used for attaching between the first recessed portion 24' and the second recessed portion 26'. In such a manner, when the first adhesive tape 32 is utilize to attach the first recessed portion 24' onto the second recessed portion 26', the display module 10''' can utilize the complementary connection of the first recessed portion 24' and the second recessed portion 26' to increase the adhesive area of the first adhesive tape 32 on the first recessed portion 24' and the second recessed portion 26', so as to enhance the connection strength between the first recessed portion 24' and the second recessed portion 26'.

Figure 6:
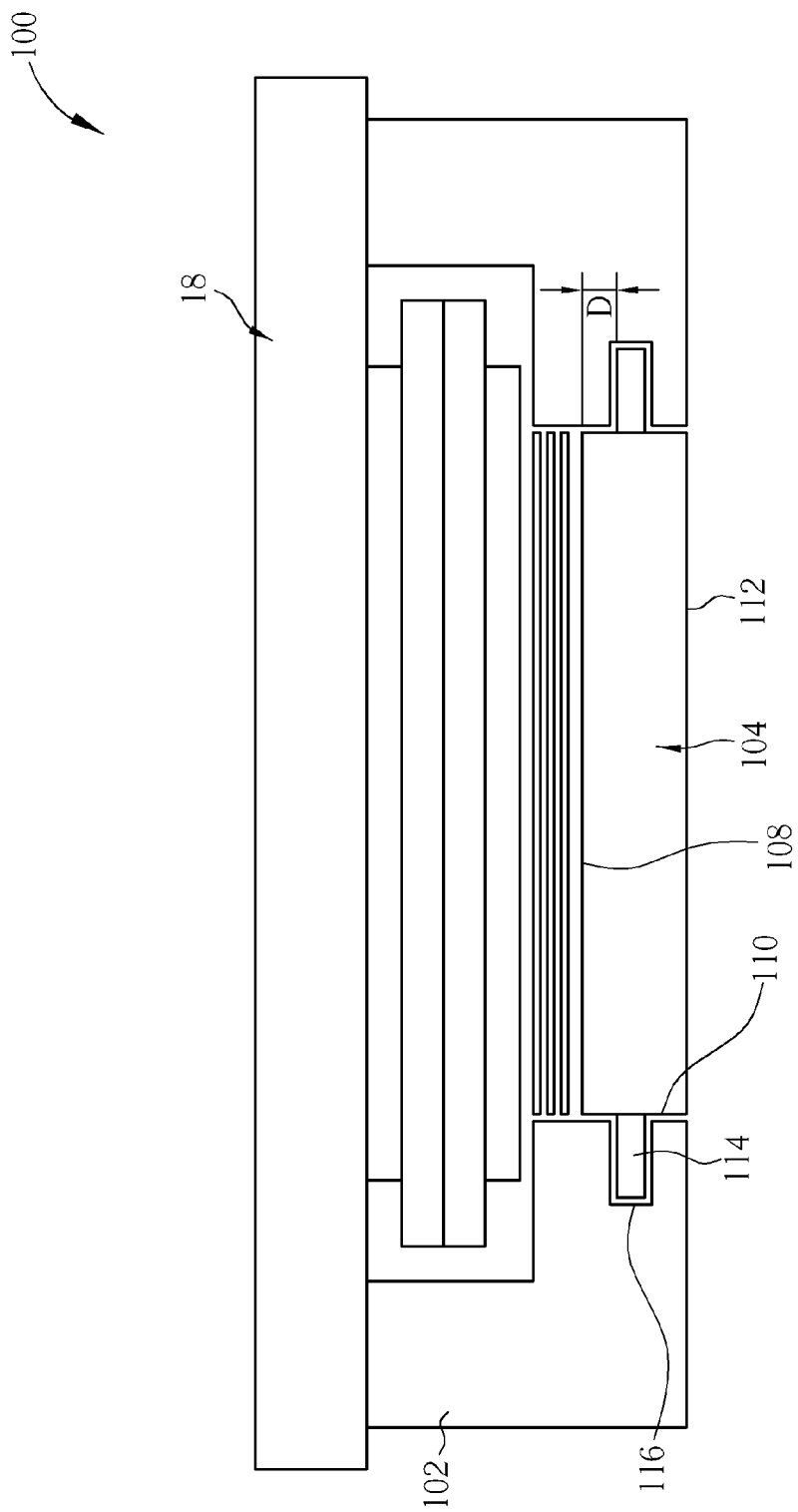
FIG. 6 is an inner front view of a display module according to another embodiment of the present invention.
Figure 7:
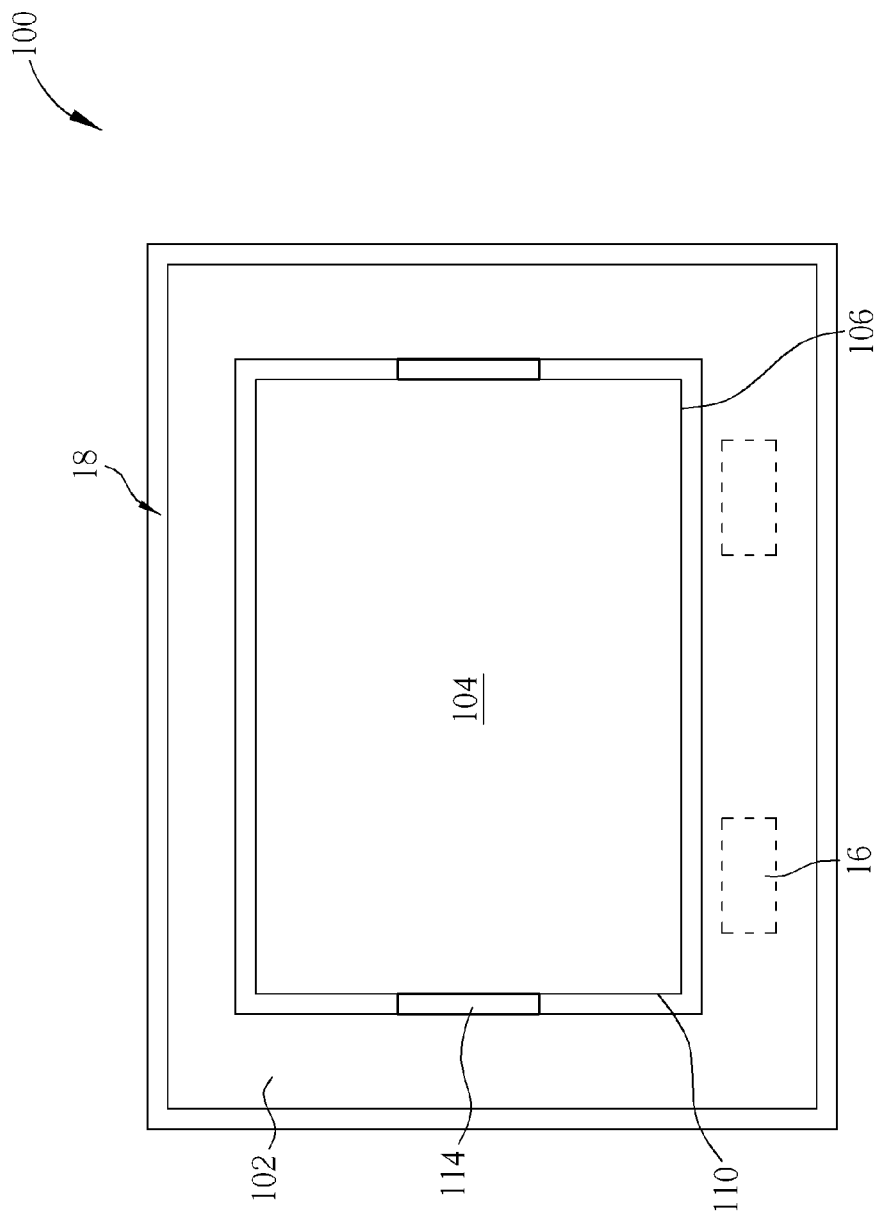
FIG. 7 is a bottom view of the display module in FIG. 6.

The structural designs of the light guide plate and the outer frame are not limited to the structural designs as shown in FIG. 1. Please refer to FIG. 6 and FIG. 7. FIG. 6 is an inner front view of a display module 100 according to another embodiment of the present invention. FIG. 7 is a bottom view of the display module 100 in FIG. 6. Components both mentioned in this embodiment and the aforesaid embodiment represent components with similar functions or structures, and the related description is omitted herein. As shown in FIG. 6 and FIG. 7, the display module 100 includes an outer frame 102, a light guide plate 104, at least one light emitting unit 16 (two shown in FIG. 7), and the panel device 18. The light guide plate 104 has a light entrance surface 106, a light exit surface 108, at least one connecting side 110 (two shown in FIG. 6 and FIG. 7), and a reflection bottom surface 112 opposite to the light exit surface 108. Accordingly, light emitted by the light emitting unit 16 can be incident into the light guide plate 104 via the light entrance surface 106, reflected by the reflection bottom surface 112, and then emitted out of the light exit surface 108 uniformly, so that the light guide plate 104 can provide sufficient light to the panel device 18.

In this embodiment, at least one connecting ear portion 114 (one shown in FIG. 6 and FIG. 7) extends outwardly from the connecting side 110. The connecting ear portion 114 can be formed on the connecting side 110 of the light guide plate 104 by a conventional integrally-forming process (e.g. an injection forming process). The outer frame 102 has a connecting slot 116 corresponding to the connecting ear portion 114. The connecting ear portion 114 is used for extending into the connecting slot 116 to be connected to the outer frame 102, so as to fix the light guide plate 104 onto the outer frame 102. The connecting ear portion 114 is away from the light exit surface 108 by a vertical distance D, and the ratio of the length of the connecting ear portion 114 to the length of the connecting side 110 is greater than 0.2. Accordingly, engagement of the connecting ear portion 114 and the connecting slot 116 can provide sufficient connection force to fix the light guide plate 104 onto the outer frame 102 firmly.

Via the design that the connecting ear portion 114 extends into the connecting slot 116, the present invention can not only efficiently prevent light emitted by the light emitting unit 16 from emitting out of the connecting ear portion 114 of the light guide plate 104 so as to solve the aforesaid hot-spot or hot-line problem, but also reduce the overall thickness of the display module 100.

It should be mentioned that the forming position of the connecting ear portion 114 is not limited to the position as shown in FIG. 6. That is, the connecting ear portion 114 can be connected to the refection bottom surface 112 of the light guide plate 104 instead, and the forming position of the connecting slot 116 can be changed to the position corresponding to the reflection bottom surface 112. Accordingly, the connecting ear portion 114 of the light guide plate 104 and the connecting slot 116 of the outer frame 102 can cooperatively form the complementary connecting structures similar to the first recessed portion 24 of the light guide plate 12 and the second recessed portion 26 of the outer frame 14. As for description for the related connecting design and the derivative embodiments, it can be reasoned according to the aforesaid embodiments and therefore omitted herein.

Compared with the prior art, the present invention utilizes the design that the first recessed portion of the light guide plate is located under and directly connected to the second recessed portion of the outer frame or the connecting ear portion of the light guide plate extends into the connecting slot of the outer frame, to fix the light guide plate onto the outer frame firmly. In such a manner, the present invention can prevent light in the light guide plate from emitting out of the side of the light guide plate so as to solve the aforesaid hot-spot or hot-line problem. Furthermore, via the complementary connection of the light guide plate and the outer frame, the present invention can further reduce the overall thickness of the display module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display module comprising:
a light guide plate having a bottom surface, a light exit surface, a light entrance surface and at least one connecting side, at least one first recessed portion being formed on the connecting side and having a convex structure extending from the bottom surface of the light guide plate and a concave structure extending from the light exit surface of the light guide plate, the convex structure of the first recessed portion having an upper surface, and at least one slot structure being formed on the upper surface;
an outer frame disposed on the light guide plate and having a second recessed portion formed thereon corresponding to the first recessed portion, the second recessed portion having a concave structure extending from a bottom surface of the outer frame and a convex structure extending from the concave structure of the second recessed portion, the convex structure of the second recessed portion having a lower surface, a protruding structure being formed on the lower surface and corresponding to the at least one slot structure, the concave structure of the first recessed portion being complementarily connected to the convex structure of the second recessed portion, and the convex structure of the first recessed portion being complementarily connected to the concave structure of the second recessed portion so that the protruding structure is engaged with the at least one slot structure for fixing the light guide plate onto the outer frame, making the convex structure of the second recessed portion stacked on the convex structure of the first recessed portion, and making the bottom surface of the outer frame aligned with the bottom surface of the light guide plate;
at least one light emitting unit disposed in the outer frame corresponding to the light entrance surface for emitting light into the light guide plate via the light entrance surface;
a first adhesive tape attached between the at least one slot structure and the protruding structure; and
a panel device disposed on the light guide plate and contained in the outer frame for receiving the light emitted from the light guide plate;
wherein the ratio of the length of the first recessed portion along a long axis direction of the first recessed portion to the length of the connecting side along the long axis direction of the first recessed portion is greater than 0.2.

2. The display module of claim 1, wherein the slot structure is a concave V-shaped structure, and the protruding structure is convex V-shaped structure.

3. The display module of claim 1, wherein the first recessed portion further has a first side surface, the second recessed portion further has a second side surface opposite to the first side surface, the display module further comprises a light shielding tape, and the light shielding tape extends from an end of the first adhesive tape and is attached onto at least one of the first side surface and the second side surface.

4. The display module of claim 1, wherein the first recessed portion further has a bottom surface, and the display module further comprises a second adhesive tape attached between the bottom surface and the outer frame.

* * * * *